Feb. 9, 1943.   D. D. CRANDELL   2,310,216
WALL BOARD
Filed Nov. 22, 1939
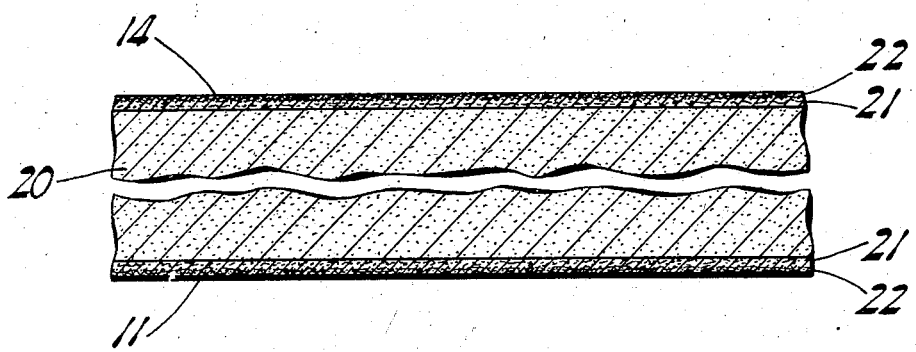
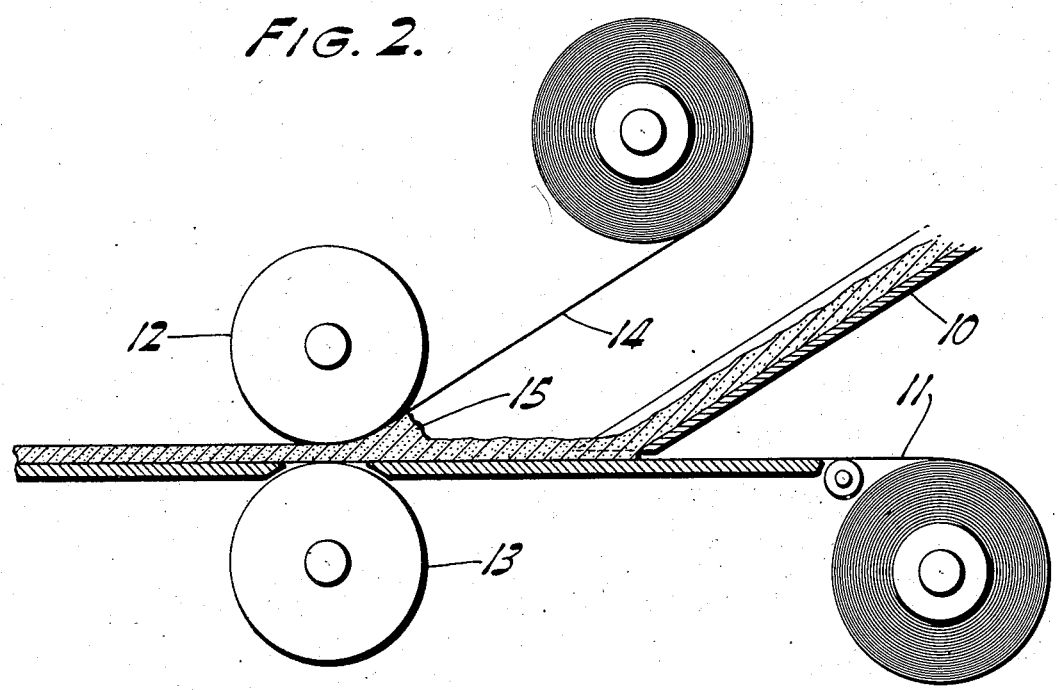
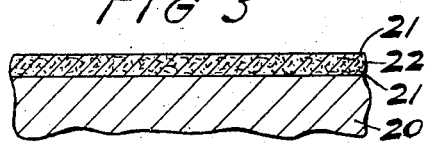
INVENTOR
DEAN D. CRANDELL
BY
Beau, Brooks, Buckley & Beau.
ATTORNEYS Patented Feb. 9, 1943

2,310,216

UNITED STATES PATENT OFFICE 2,310,216

WALLBOARD

Dean D. Crandell, Buffalo, N. Y., assignor to National Gypsum Company, Buffalo, N. Y.

Application November 22, 1939, Serial No. 305,702

8 Claims. (Cl. 154—45.9)

The present invention relates to wallboard and more particularly to that type of wallboard in which a cementitious core is covered with fibrous facing sheets.

Heretofore in the manufacture of wallboard of the type referred to, the cementitious core, comprising a plastic mix of, for instance, calcined gypsum, water, and finely divided waste paper pulp, was fed between an upper and lower paper facing sheet as the same was being passed through master rolls set to produce board of the caliper desired. The provision of paper facing sheets made possible the production of a wallboard of considerably greater strength than the strength of the plaster core. In order to produce board of commercially acceptable characteristics, it has been impossible, heretofore, to use facing sheets of less than about 0.019 inch in thickness and designated in the trade as 60-pound chip paper. Many attempts have been made heretofore to employ paper of less weight and thickness for facing sheets for wallboard but all these attempts have produced board of inferior characteristics and not acceptable for the purposes intended.

Where thin lightweight kraft paper was employed as a facing sheet, incomplete bonding resulted, while with lightweight chip paper, the resulting board possessed insufficient strength for the purposes intended. Furthermore with smaller caliper papers, the facing sheet wrinkles, bulges and corrugates and the paper separates from the core at the bonding surface showing the presence of a bond weaker than the paper itself. The generally accepted standard was 60-pound chip paper.

When wallboard is cut on the job the board is scored on one or both sides at the desired line of severance and the board then broken along this line. It is often necessary on the job to cut wallboard and a good clean break is required in order to get a tight fit at the board edges. With thick papers the scoring is often inadequate to produce a clean break and in consequence much wastage is encountered. By the provision of low caliper lightweight paper, clean breaks of the board are obtained upon scoring the surfacing paper.

The present invention provides a wallboard in which a cementitious core is faced with paper of materially less thickness and of less weight per unit area than has been possible of employment heretofore with the production of a board of comparable strength.

The present invention also provides a wallboard having a thin lightweight facing paper and wherein the strength of bond between the core and the facing paper is equal to or greater than the strength of the paper.

The present invention also provides a wallboard readily and easily scored so that the same may be broken and severed cleanly.

The present invention, therefore, provides a means for producing wallboard of standard strength and quality wherein material economies are effected in paper costs.

As an additional advantage, the present invention provides a wallboard of the type described wherein thin lightweight facing paper is bonded to the cementitious core and wherein the bond between the paper and core is materially better than bonds heretofore produced.

Further objects and advantages of the invention will appear hereinafter and will be pointed out with particularity in the claims.

In the drawing:

Fig. 1 represents an enlarged sectional view of wallboard of the present invention;

Fig. 2 shows the forming end of a wallboard machine and illustrates diagrammatically the feed of the plastic core between facing sheets.

Fig. 3 is an enlarged fragmentary sectional view of another form of the invention.

In accordance with the present invention, a plastic mix of any suitable composition, capable of being fed between facing sheets, of being formed between forming rolls and capable of setting or crystallizing in a relatively short period of time, is fed from a mixing machine through a feed chute 10 onto a moving paper sheet 11 which constitutes the front face of the finished wallboard. This sheet is continually advanced along the wallboard machine from the forming end thereof to the drying end. The lower sheet is advanced between a pair of forming or caliper rolls 12 and 13 set to produce wallboard of the thickness desired. As is well known in the art, the edges of the lower sheet may be scored and upturned to form paper-coated edges of the wallboard or may be rolled to produce a round folded edge. The wallboard is completed by passing a second paper sheet 14 through the forming rolls and on top of the plastic mass of core material 15 fed upon the lower sheet. There is thus produced a continuously advancing wallboard completely covered by facing paper. After crystallization or set of the core the product is then cut into the desired lengths, passed into a dryer and dried.

In accordance with the present invention an in contrast to prior practices, the paper sheets for facing the core comprise a paper in which one side thereof is formed of relatively weak fibers that are highly water absorbent while immediately adjacent is a section formed of relatively long, strong fibers.

In general chip paper is made of waste papers and fabrics and therefore the fibers of such papers are degraded to a large extent. Furthermore, the fibers of chip paper are short and possess comparatively little fiber strength. Fibers of this type are additionally relatively water absorbent. In contrast to this, so-called sulfate and other chemical fibers are relatively long and strong as they are virgin fibers. The paper used in manufacturing the wallboard of the present invention is fabricated from both long, strong fibers, and the short, weak, relatively water absorbent fibers from waste. One side of the paper is therefore of short, weak, relatively water absorbent fibers placed adjacent a section of long, strong fibers. In general, the short fibers constitute about one-third the thickness of the finished paper. Thus a paper about 0.01 inch thick will have 0.003 inch of short fibers or less, the remaining thickness being long fibers. In general, the facing sheet of the present invention will have a thickness of less than about 0.015 inch and a weight of less than about 45 pounds per thousand square feet. Paper 0.01 inch thick and 30 pounds in weight has been found eminently satisfactory.

In the manufacture of the wallboard, the side of the paper made of the short, weak fibers and fibers that are relatively water absorbent are placed in contact with the plastic mass forming the core, pressed upon the plastic mass and the plastic mass permitted to set or crystallize in contact with the side of the paper containing the short, weak fibers.

Since the plastic mix fed between the facing paper is a water slurry of a cementitious material capable of setting or crystallizing, it is believed the water solution of the slurry penetrates the paper and carries into the same a very small amount of the cementitious material which sets in and aids in bonding the paper to the core.

It is also believed that materially improved penetration of water containing dissolved matter capable of setting is obtained by employment of this type of paper and therefore upon drying, a better bond is obtained between the paper and set core, a bond that is stronger than the paper itself since upon breaking the board, the paper does not pull away from the core leaving the raw core exposed but rather tears away, leaving the paper still adhering to the core.

The facing paper 11 and 14 employed in the present invention comprises a paper sheet in which the side of the sheet placed adjacent core 20 comprises relatively short, weak fibers while the other side of the sheet comprises relatively long, strong fibers. Therefore the exposed side of the sheet is relatively tougher than the bonded side of the sheet. In some instances the bonded side of the sheet is made of short, matted, sized material, the size employed being a water-soluble salt hydrolyzable with the production of an inorganic colloid and being capable of accelerating the set of the cementitious core material. Thus, alum or aluminum sulfate constitutes an excellent sizing material for this side of the sheet since it produces colloidal aluminum hydroxide and a material containing the sulfate ion which tends to aid in the formation of crystallized calcium sulfate dihydrate when in contact with a solution of a plastic mix of water and calcined gypsum in the form of calcium sulfate hemihydrate.

The relatively strong, long fibered side of the paper facing sheet may be rendered relatively water repellent by the addition of size thereto. This size may be any well known size used in the paper art and starch and rosin size may be mentioned as suitable, although the other water repellent sizes may also be employed. If desired, this side of the sheet may be calendered to accentuate the property desired therein.

In the production of certain types of wallboard, it is desirable to have both the bond and exposed sides of the paper water absorbent while in some instances it is desirable to have the exposed side relatively water repellent. For instance, in the employment of plaster lath, a plastic mix of water and calcined gypsum is applied to the face of the lath and therefore water absorbent characteristics are desired in the exposed surface of the sheet. In the production of certain types of so-called wide board, a water repellent facing is preferable and therefore the exposed surface of the sheet used for this type of board is relatively water repellent.

As shown in Fig. 1 of the drawing, the set cementitious core 20 is enclosed in facing sheets 11 and 14 of the type described. Thus, lower sheet 11, having one side thereof composed of relatively short, weak fibers and the other side of relatively long, strong fibers is placed upon the core in such fashion that the side of the paper 21 composed of relatively short, weak fibers is placed in contact with core 20, while the side of the paper 22 composed of relatively long, strong fibers constitutes the exposed surface of the facing sheet. Similarly facing sheet 14 of the same type as sheet 11 is placed with the short fibered side in contact with core 20.

Where the exposed sheet is to possess water absorbent characteristics, both the bonded surface and the exposed surface are made of short, relatively weak fibers, as, for instance, chip fibers 21, with an intermediate section of long, strong fibers 22, as shown in Fig. 3. In such a paper the surfaces of short, weak fibers will be about 0.0015 inch and the intermediate layer or ply of long, strong fibers, such as sulfate or chemical fibers, about 0.008, making a total thickness of paper of 0.01 to 0.011 inch.

By the provision of covering paper of the type described, a wallboard is produced that possesses a considerably greater resistance to breakage across the lateral dimension of the board. Thus, in the old type board with 60 pound chip paper, the strength required to break across the lateral dimension of the board was 35 pounds while with the new lightweight, thin paper described, this figure has been raised to 52 pounds.

From the foregoing it will be seen that the present invention provides a wallboard of commercially acceptable characteristics and one that can be made at considerable economy.

I claim:

1. Wallboard comprising a set cementitious core and an enclosing envelope, said envelope comprising a paper sheet formed of relatively short, weak, water absorbent, waste fibers in contact with the core and of relatively long, strong, chemical fibers in the exposed surface of the sheet, said sheet weighing less than about 45 pounds per thousand square feet.

2. Wallboard comprising a set cementitious core and an enclosing envelope, said envelope comprising a paper sheet formed of relatively short, weak, water absorbent, waste fibers containing substantially no organic size in contact with the core and of relatively long, strong, chemical fibers containing a relatively large amount of size away from the core, said sheet weighing less than about 45 pounds per thousand square feet.

3. Wallboard comprising a core of set gypsum plaster and a paper facing sheet bonded thereto, said sheet having relatively short, weak, water absorbent, waste fibers in the surface in contact with the plaster core and having relatively long, strong, chemical fibers in the exposed surface of the sheet, said facing sheet having a thickness of about 0.015 inch and a weight of less than 45 pounds per thousand square feet.

4. Wallboard comprising a core of set gypsum plaster and a paper facing sheet bonded thereto having a thickness of the order of 0.010 inch to 0.015 inch and a weight of less than 45 pounds per thousand square feet, said sheet comprising a plurality of layers, one of said layers being of weak, water absorbent, waste fibers in contact with the core and another of said layers being of strong, chemical fibers.

5. Wallboard comprising a core of set gypsum plaster and a facing sheet of paper bonded thereto, said sheet having relatively short, weak, water absorbent, waste fibers in the surface in contact with the plaster and having relatively long, strong, chemical fibers in the exposed surface of the sheet, the short fibers constituting about one-third the total thickness of the paper, said sheet weighing less than about 45 pounds per thousand square feet.

6. Wallboard comprising a set cementitious core and an enclosing envelope, said envelope comprising a paper sheet having a surface ply of relatively weak, water absorbent, waste fibers in contact with the core and a ply of relatively long, strong, chemical fibers adjacent to said weak fibers, said sheet weighing less than about 45 pounds per thousand square feet.

7. Wallboard comprising a cementitious core and an enclosing envelope, said envelope comprising a multi-ply paper sheet having inner and outer surfaces of relatively short, weak, water absorbent, waste fibers and an intermediate ply of relatively long, strong, chemical fibers, said sheet weighing less than about 45 pounds per thousand square feet.

8. Wallboard comprising a cementitious core and an enclosing envelope, said envelope comprising a multi-ply paper sheet having inner and outer surfaces of relatively short, weak, water absorbent, waste fibers and an intermediate ply of relatively long, strong, chemical fibers, said sheet having a thickness of the order of 0.010 to 0.015 inch and a weight of less than about 45 pounds per thousand square feet.

DEAN D. CRANDELL.